US005774539A

United States Patent [19]
Maass et al.

[11] Patent Number: 5,774,539
[45] Date of Patent: Jun. 30, 1998

[54] COMMUNICATION SYSTEM HAVING SWITCHABLY-COUPLED SUBSCRIBER TERMINALS

[75] Inventors: Henning Maass; Martin Stahl; Thomas Falck, all of Aachen; Oliver Schreyer, Herzogenrath, all of Germany

[73] Assignee: U.S. Philips Corporation, New York, N.Y.

[21] Appl. No.: 652,398

[22] Filed: May 23, 1996

[30] Foreign Application Priority Data

May 26, 1995 [DE] Germany .................. 195 19 402.0

[51] Int. Cl.⁶ .................. H04M 3/42; H04M 3/44; H04M 3/54; H04J 3/12
[52] U.S. Cl. .................. 379/207; 370/524; 379/211; 379/216; 379/356
[58] Field of Search .................. 379/201, 207, 379/211, 219, 220, 225, 216, 355, 356, 357; 370/62, 94.1, 110.1, 384, 385, 426, 522, 524

[56] References Cited

U.S. PATENT DOCUMENTS

| 4,899,373 | 2/1990 | Lee et al. ..................... 379/201 X |
| 5,012,466 | 4/1991 | Buhrke et al. ..................... 370/62 |
| 5,392,340 | 2/1995 | Otsuka ..................... 379/201 |

*Primary Examiner*—Harry S. Hong
*Attorney, Agent, or Firm*—Steven R. Biren

[57] ABSTRACT

A communication system includes subscriber terminals which can be coupled via at least one switch, and to which subscriber terminals, several call numbers can be assigned for which telecommunication parameters are definable. The subscriber terminals each store respective telecommunication parameters. In the case of a change of assignment of a subscriber call number from a first subscriber terminal to a second subscriber terminal, the telecommunication parameters belonging to the subscriber call number are transmitted to the second subscriber terminal. The communication system is preferably implemented in ISDN switching systems with ISDN telephones as terminals.

9 Claims, 3 Drawing Sheets

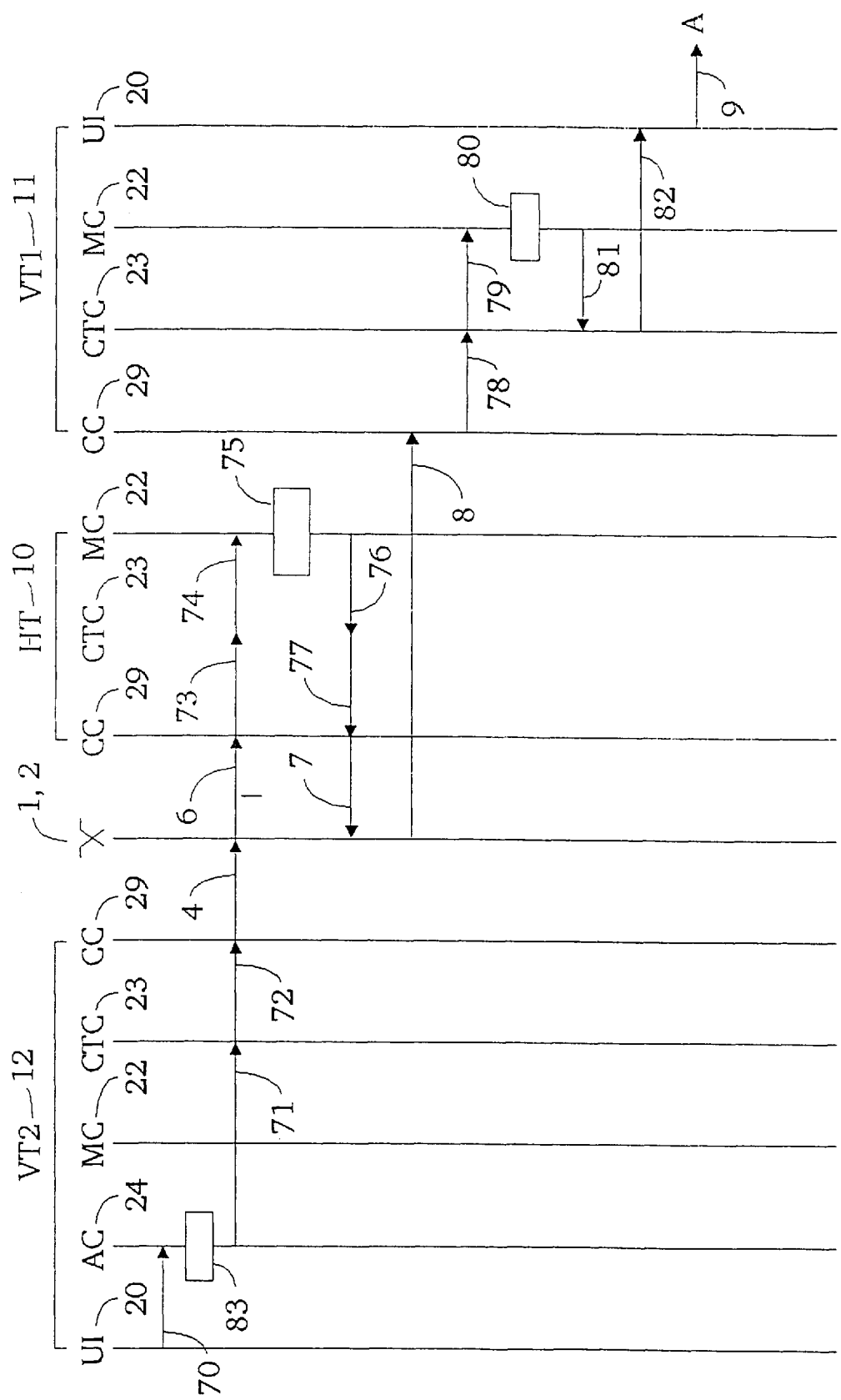

COMMUNICATION SYSTEM HAVING SWITCHABLY-COUPLED SUBSCRIBER TERMINALS

BACKGROUND OF THE INVENTION

1. Field of the Invention

The invention relates to a communication system with subscriber terminals which can be coupled via at least one switch, and to which subscriber terminals several call numbers can be assigned for which telecommunication parameters are definable.

2. Discussion of the Related Art

Such a communication system is, for example, a private branch exchange. It is also possible for several private branch exchanges to form such a communication system. The invention may also be applied to public switching systems.

In ISDN (Integrated Services Digital Network) systems there is a possibility of assigning several subscriber call numbers to one subscriber line and thus to one subscriber terminal. If a subscriber changes his location, he can activate a call diversion in the respective switch, so that his call number is assigned to another subscriber terminal and calls to his own subscriber terminal are diverted to another subscriber terminal. In addition, for his own subscriber line it is possible for a subscriber to define telecommunication parameters, for example, a speed dialling or shortcode dialling list, a personal list of telephone numbers, a personal key assignment, call statistics or personal call charge parameters. A subscriber's telecommunication parameters are assigned to his subscriber line and stored in the switch.

SUMMARY OF THE INVENTION

It is an object of the invention to improve the subscriber mobility in the communication system of the type defined in the opening paragraph.

The object is achieved in that the telecommunication parameters are stored in storage means of the subscriber terminals and in that telecommunication parameters related to a subscriber call number are transmitted from a first subscriber terminal to a second subscriber terminal when an assignment of the subscriber call number is changed from the first subscriber terminal to the second subscriber terminal.

For each authorized user of the communication system can be defined telecommunication parameters which facilitate for the user especially the telecommunication with other users of the communication system and which may also determine management operations, for example, a special charge registration for the respective user. A restriction of a user's communication possibilities with other subscribers of the telecommunication system is also possible via the telecommunication parameters. The change of assignment of a subscriber call number from the first to the second subscriber terminal is effected when the subscriber wishes to use the second subscriber terminal instead of the first subscriber terminal and registers with the second subscriber terminal as the current user. According to the invention, this subscriber's complete range of telecommunication parameters can also be rendered available to him from the second subscriber terminal. Calls meant for this subscriber are diverted to the second subscriber terminal. The technical modifications of the communication system necessary for enhancing the subscriber mobility are concentrated on the subscriber terminals. The switch can remain unchanged. The decentralized architecture of the communication system in respect of the communication of a subscriber having personal telecommunication parameters enhances the reliability of the communication system and renders this system easily extendable for further subscribers. For example, also the storage means for storing the telecommunication parameters are arranged in the subscriber terminals.

In an embodiment of the invention, a third subscriber terminal includes storage means for continuously storing the telecommunication parameters related to this subscriber call number and, when a change of the assignment of the subscriber call number is made, the telecommunication parameters are transmitted from the third subscriber terminal to the second subscriber terminal to store the telecommunication parameters in the second subscriber terminal.

In this embodiment there is ensured that after the transmission of the telecommunication parameters and the change of assignment of the subscriber call number to the second subscriber terminal the telecommunication parameters are redundantly stored in two subscriber terminals. Compared with the loss of stored telecommunication parameter data, there is thus an enhanced reliability. When the third subscriber terminal is provided for storing the telecommunication parameters of all the subscribers, the necessary storage space may, in essence, be concentrated on the third subscriber terminal (server principle). The redundant storage of telecommunication parameters may be realized cost-effectively in this manner.

The invention is furthermore embodied in an advantageous manner in that, when an assignment of the subscriber call number is changed from the first to the second subscriber terminal, the telecommunication parameters related to this subscriber call number are transmitted from the first to the second subscriber terminal to store the telecommunication parameters in the second subscriber terminal.

This is advantageous in that the telecommunication parameters no longer need to be continuously stored in a subscriber terminal provided for this purpose. The storage means provided for such a constant storage of telecommunication parameters can be omitted.

In another embodiment of the invention, an entry of both the subscriber call number and a personal identification number is necessary for changing the assignment of the subscriber call number to the second subscriber terminal and/or for changing the telecommunication parameters related to the subscriber call number.

For a change of the assignment of a subscriber call number and/or a change of personal telecommunication parameters to be performed only by an authorized subscriber, it is necessary that a personal identification number which is only made known to the authorized subscriber be entered first. The entry of the subscriber call number is necessary because the subscriber terminal with which the associated subscriber is registered and the respective telecommunication parameters of that subscriber are assigned to such a number. The subscriber call number is used as a publicly available identification number of the subscriber.

The invention may also be embodied in that one subscriber terminal is provided for each subscriber call number, which subscriber terminal is used for receiving calls for this subscriber and for diverting these calls from there to the subscriber terminal to which the subscriber call number of the subscriber is currently assigned.

The subscriber terminal provided for receiving calls for the said subscriber first receives all the calls for such a subscriber and diverts these calls, as required, via the switch to the subscriber terminal with which the subscriber has just registered. If the subscriber wishes to utilize another subscriber terminal because he has changed his position, the assignment of the subscriber call number needs to be changed only in the subscriber terminal used for receiving calls for this subscriber.

Furthermore, for embodying the invention, a fixed subscriber terminal call number is assigned to each subscriber terminal in addition to the respective subscriber call numbers.

A subscriber terminal can be simply addressed by the fixed subscriber terminal call number, irrespective of the subscriber call number. In a simple manner it is then possible to realize a call diversion or a transmission of telecommunication parameters between the subscriber terminals.

The communication system according to the invention is further embodied in that storage means for storing telecommunication parameters relating to a subscriber's restricted communication are arranged in each subscriber terminal.

Such telecommunication parameters which are predefinable and do not relate to a specific subscriber are available to any subscriber at any subscriber terminal of the communication system. The authorization to use these telecommunication parameters is not checked. For example, when a private branch exchange is used, the communication may be restricted to an exchange of information within the private branch exchange.

These and other aspects of the invention will be apparent from and elucidated with reference to the embodiments described hereinafter.

BRIEF DESCRIPTION OF THE DRAWINGS

In the drawings:

FIG. 4 shows a flow chart for a call to a mobile user.

DETAILED DESCRIPTION OF THE PREFERRED EMBODIMENTS

Figure 1:
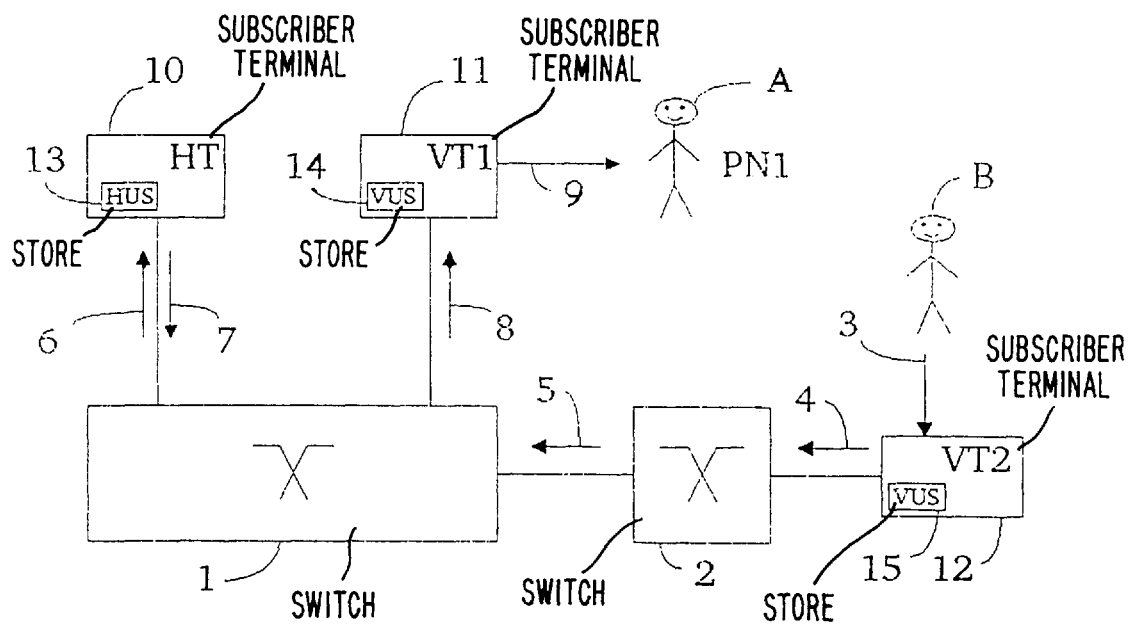
FIG. 1 shows a communication system according to the invention with various subscriber terminals.

The communication system shown in FIG. 1 comprises a first switch 1 and a second switch 2. The switches may represent both private branch exchanges and a public switching center. In the present case the first switch 1 is an ISDN private telecommunications switching system (Private Branch Exchange). The second switch 2 is a public switching center coupled to the first switch 1 via the public telephone network. To the first switch 1 are connected a subscriber terminal 10 (HT, Home Terminal) and a subscriber terminal 11 (VT1, Visited Terminal). A subscriber terminal 12 (VT2) having a store 15 (VUS, Visited User Store) is coupled to the second switch 2. For clarity, the representation of further possible switches or further subscriber terminals that can be linked to the switches have been omitted. At the point of the subscriber terminal 12 is located the subscriber B. The subscriber A is a mobile subscriber who occasionally uses, for example, the subscriber terminal 11, so that he initiates communication operations from there and can be reached via this terminal. To the subscriber A are assigned a subscriber call number PN1 and telecommunication parameters. The telecommunication parameters for a subscriber are variable. Examples for telecommunication parameters are a speed dialling or shortcode dialling list, a personal list of telephone numbers, a personal key assignment, a set of call statistics or personal call charge parameters. Via the telecommunication parameters it is also possible to restrict the authorization for communicating with or telephoning another subscriber. For example, an international communication may be excluded. Subscriber A's telecommunication parameters are continuously stored in a store 13 (HUS, Home User Store) of the subscriber terminal 10. As long as subscriber A is registered as a user of, for example, the subscriber terminal 11, his telecommunication parameters are stored in the storage area 14 (VUS Visited User Store) of the subscriber terminal 11. The registration of the subscriber A in subscriber terminal 11 is stored as data information in store 13 of the subscriber terminal 10. The registration of the subscriber A with subscriber terminal 11 will be further explained with reference to FIG. 3. The arrows 3 to 9 are used for clarifying the procedures which are carried out when subscriber B calls subscriber A after such a registration. These procedures will be further described with reference to FIG. 4.

Figure 2:
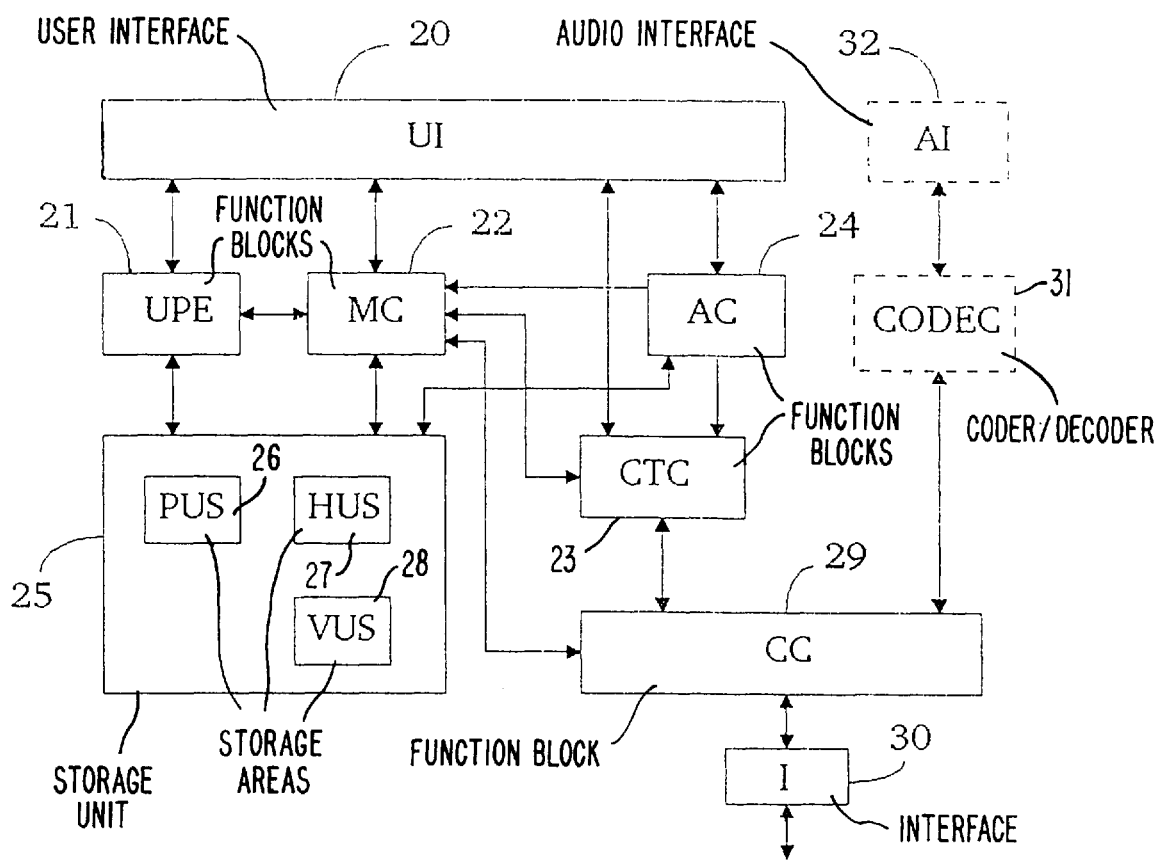
FIG. 2 shows a block circuit diagram for a subscriber terminal of the communication system.

FIG. 2 shows a block circuit diagram representing the structure of the subscriber terminals 10, 11 and 12 which are, more particularly, ISDN telephones. Such a subscriber terminal contains a user interface 20 (UI User Interface) via which a subscriber (user) at the subscriber terminal can communicate with the terminal. For example, the subscriber can enter data such as a telephone number or a shortcode dialling number via a control panel, or read information about a communication process from a display element. Furthermore, a subscriber can register with the subscriber terminal as a current user via the interface 20. The user interface 20 is coupled to function blocks 21, 22, 23 and 24 for exchanging data. The function block 21 is a User Profile Editor (UPE) by which the user profile of a subscriber i.e. his telecommunication parameters, are changed. For this purpose, the function block 21 is coupled to a storage unit 25 which includes storage areas 26, 27 and 28. In the storage area 26 are stored telecommunication parameters which represent a simplified user profile and which may be utilized by any user. The storage area 26 is referenced PUS (Plane User Store). The storage area 27 is used for continuously storing telecommunication parameters of subscribers whose calls are brought in, in principle, via this subscriber terminal. Their subscriber call numbers and personal identification numbers are also stored here. If the respective subscribers are registered as users with another subscriber terminal, the subscriber terminal number of the other subscriber terminal is also stored in this storage area 27. The telecommunication parameters stored in the storage area 27 are not deleted when a respective subscriber registers as a user with another subscriber terminal. The storage area 27 is referenced HUS (Home User Store). On the other hand, the storage area 28 is used for storing telecommunication parameters belonging to a subscriber who is registered only occasionally with this subscriber terminal as a current user. The call number and personal identification number of such a subscriber are also stored in the storage area 28. After a deregistration of a user who registered only occasionally with this subscriber terminal, the telecommunication parameters belonging to that subscriber are deleted.

The function blocks 22, 23 and 24 as well as a function block 29 represent control units which may be used for controlling the functions of the subscriber terminal and are realizable, for example, by microprocessor techniques. The controller 23 (CTC Conventional Terminal Controller) combines the conventional control functions of a telecommunication terminal, in this case of an ISDN telephone. The controller 24 (AC Access Controller) checks the subscriber's access authorization when a user accesses the subscriber terminal via the user interface 20. The check of a subscriber is performed on the basis of the subscriber's personal identification number (PIN) he has to enter via the user interface 20. If a subscriber's authorization for access has been ascertained by the controller 24, this information is transmitted to the controllers 22 and 23 which control the subscriber terminal in such a way that the desired use by the subscriber is made possible. The controller 22 (MC Mobility Controller) combines the control functions needed for establishing user mobility. The controller 22 controls both the access to the storage unit 25 and the telecommunication parameters stored there and the functions of the subscriber terminal which ensure that subscribers registered with this subscriber terminal can establish and carry out a communication via this subscriber terminal or can be reached via this subscriber terminal, respectively. For this purpose, the controller 22 is coupled to the function block 21, the controllers 23 and 24, and also to a controller 29. The controller 29 (CC Communication Controller) is furthermore coupled to the controller 23 and an interface 30. The telecommunication terminal is coupled to a switch such as, for example, the switch 1 or 2 of FIG. 1 via the interface 30. The access of the controllers 22 and 23 to the interface 30 is controlled by the controller 29. The controller 29 further distributes control signals received through the interface 30 over the controllers 22 and 23. In the embodiment of an ISDN telephone, the control signals generated by the controllers 22 and 23 respectively, are applied to an available D-channel via the controller 29 and the interface 30. Also control signals to be distributed over the controllers 22 and 23 by the controller 29 represent control signals received via a D-channel. The interface 30 is in that case an So interface.

Via a coder/decoder (CODEC) 31, which is coupled both to the controller 29 and to an Audio Interface (32) (AI), speech signals generated by a subscriber at the subscriber terminal are converted into a suitable data signal which is sent through the interface 30. Likewise, respectively received data signals are converted by the coder/decoder 31 and the audio interface 32 into speech signals for the user who utilizes the subscriber terminal. In an ISDN telephone, such speech signals are transmitted by B channels.

Figure 3:
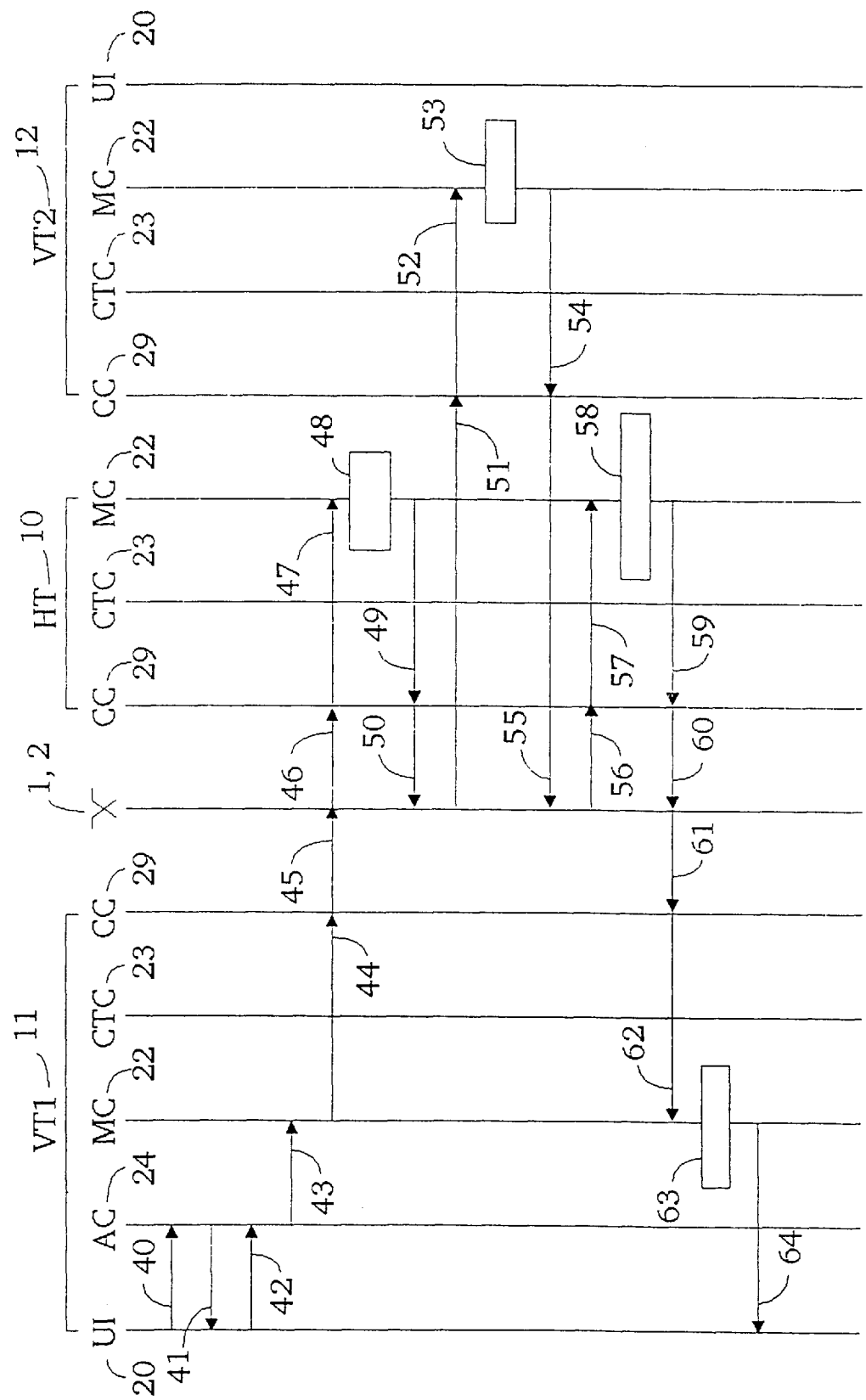
FIG. 3 shows a flow chart for a registration with a subscriber terminal.

FIG. 3 shows the order of events for a registration of a subscriber, for example, the registration of subscriber A under subscriber call number PN1 with subscriber terminal 11 (VT 1), the subscriber A previously being registered as a user with subscriber terminal 12 (VT2). After the registration with subscriber terminal 11, this subscriber terminal 11 is therefore assigned the subscriber call number PN1 apart from any further subscriber call numbers of further subscribers registered there. Each subscriber terminal is additionally assigned a subscriber terminal number: number TN0 assigned to terminal 10, number TN1 to terminal 11 and number TN2 to terminal 12. The structure of the subscriber terminals 10, 11 and 12 which determine the registration in the present example corresponds to the structure of the subscriber terminal represented in FIG. 2. There are differences only with respect to the storage unit 25. For example, for saving storage capacity, the present illustrative embodiment lacks the storage area HUS in the subscriber terminals 11 and 12 which, however, is not a necessity. The saving on storage means HUS is possible in this special constellation of the communication system, because the telecommunication parameters of all the subscribers are fixedly stored in the storage area HUS, and telecommunication parameters are always transmitted from terminal 10 when other subscriber terminals (in this case 11 and 12) are registered with.

The registration with subscriber terminal 11 made by the subscriber A is introduced by the generation of a registration signal which, in step 40, is transmitted to the controller 24 via the user interface 20. The registration signal contains subscriber A's subscriber call number PN1 to distinguish this subscriber from other subscribers. Then follows an interrogation of the personal identification number (PIN) only known to authorized persons, which belongs to subscriber A's call number PN1. For this purpose, the controller 24 transmits in step 41 an appropriate interrogation signal to the subscriber A via the user interface 20. This subscriber A transmits the requested personal identification number (PIN) in step 42 via the user interface 20 to the controller 24, which thereupon generates in step 43 a registration signal containing as parameters the subscriber call number PN1 and the related personal identification number and which is transmitted to the controller 22. The controller 22 now generates a so-called Location Update Signal and transmits same in step 44 to the controller 29, from where it is transmitted via the switches 1 and 2 to the subscriber terminal 10 in steps 45 and 46. The Location Update Signal contains as parameters the call number TN1 of the subscriber terminal 11, subscriber A's subscriber call number PN1 and subscriber A's personal identification number (PIN). The Location Update Signal is received in the subscriber terminal 10 by the controller 29 and applied to the associated controller 22 in step 47. This controller 22 ascertains, on the basis of the information stored in the storage area HUS of the subscriber terminal 10, whether the correct personal identification number has been entered for the subscriber call number PN1 and, furthermore, determines the call number TN2 of the subscriber terminal 12 with which the subscriber A has just registered under the subscriber call number PN1. This is combined in step 48.

In the steps 49, 50 and 51, after completion of step 48, a delete signal is transmitted to the subscriber terminal 12 via the controller 29 of the subscriber terminal 10 and the switches 1 and 2. The delete signal contains subscriber A's subscriber call number PN1 as parameters. The delete signal is received by the controller 29 of the subscriber terminal 12 and conveyed there to the respective controller 22 in step 52. This controller 22 deletes in step 53 the telecommunication parameters having subscriber A's registration data which are stored under the subscriber call number PN1 in the storage unit 25 (not shown in FIG. 3) (to be more precise, in the respective storage area VUS) of the subscriber terminal 12. After the telecommunication parameters have been deleted, the controller 22 generates a delete acknowledge signal which contains subscriber A's subscriber call number PN1 as parameters and which is transmitted in the steps 54, 55 and 56 via the controller 29 of the subscriber terminal 12 and the switches 1 and 2 to the controller 29 of the subscriber terminal 10. From there, this delete acknowledge signal is applied to the controller 22 of the subscriber terminal 10 in step 57. This controller 22 now stores in the subscriber terminal 10 (in the storage area HUS) the call number TN1 of the subscriber terminal 11 as the call number of the respective subscriber terminal where the subscriber A is currently registered (step 58) as an authorized user having the subscriber call number PN1. Subsequently, the telecommunication parameters belonging to subscriber call number PN1 are read from the storage area HUS of the terminal 10 and, in steps 59, 60 and 61, together with an acknowledge signal for changing the registration of subscriber A or his subscriber call number PN1 respectively, transmitted to the subscriber terminal 11 via the controller 29 of the subscriber terminal 10 and the switches 1 and 2. There the acknowledgement signal containing the telecommunication parameters is received by the controller 29 of the telecommunication terminal 11 and in step 62 transported to the respective controller 22. The latter stores the telecommunication parameters relating to the subscriber call number PN1 in the storage area VUS of storage unit 25 (steps 63).

The thus effected registration of subscriber A under the subscriber call number PN1 in the subscriber terminal 11 is displayed, for example, on a display, in step 64 by a display signal generated by the controller 22 and supplied via the user interface 20. The subscriber A can now establish a communication to other subscribers from subscriber terminal 11 while utilizing his own telecommunication parameters. Furthermore, calls for him are transferred to the subscriber terminal 11 which will be further described with reference to FIG. 4.

In the communication system according to the invention it is also possible to effect a subscriber's deregistration without him being registered. Such a deregistration is not introduced by a registration signal as in step 40 of FIG. 3, but by a respective deregistration signal. In the case of the deregistration, only the subscriber terminal 10 and one more subscriber terminal take part. The necessary steps may be derived from the embodiments with reference to FIG. 3, in that the steps for subscriber A's deregistration are taken over by subscriber terminal 12 and the steps for the registration are omitted at subscriber terminal 11. Such a deregistration is used, for example, if a subscriber is absent for a long period of time and thus does not act as a user of the communication system during this time. If a subscriber temporarily stops acting as a user of the communication system, there is an extended deregistration during which telecommunication parameters belonging to this subscriber or to his subscriber call number respectively, are deleted in all the subscriber terminals.

With reference to FIG. 4, the operation already coarsely described in FIG. 1 will be further explained, in which the subscriber B makes a call to subscriber A from subscriber terminal 12, which subscriber A is registered with subscriber terminal 11 as an authorized user. For this purpose, the subscriber B enters in step 3 (see FIG. 1) subscriber A's subscriber call number PN1 at subscriber terminal 12 which causes a call request signal to be generated there by the user interface 20, which call request signal contains the subscriber call number PN1 as a parameter. The call request signal is transported to the controller 24 in step 70 which controller 24 performs an evaluation of subscriber B's telecommunication parameters in step 83, which are stored in the store VUS of the subscriber terminal 12, so that the access is controlled and/or restricted and/or simplified by subscriber B. An access control may be carried out, for example, by a user via a display of the terminal 12.

A restriction of the access is, for example, a restriction to inland calls. A simplification of the access is realized, for example, by a shortcode dialling list attuned to the subscriber B. If the access is classified as permissible by the controller 24, the call request signal will be transmitted by the controller 24 in steps 71, 72 and 4, via the controllers 23 and 29 of the subscriber terminal 12, to the switch 2 which then generates a call release signal having PN1 as a parameter which signal is transmitted via switch 1 to the subscriber terminal 10 in step 6.

In this embodiment the selection of the subscriber terminal 10 as a destination terminal for a transmission of the call release signal is then independent of the respective subscriber call number (here: PN1). If still further subscriber terminals are then eligible for a destination terminal (not shown here), the respective subscriber terminal call number is fixedly assigned to one of the subscriber terminals eligible for a destination terminal, for example, by analogy with the preceding embodiment, the subscriber call number PN1 to the subscriber terminal 10.

In steps 73 and 74, the call release signal is first applied via the controller 29 of the subscriber terminal 10 to the controller 23 and then to the controller 22 of the subscriber terminal 10. Controller 22 checks in step 75 with what subscriber terminal subscriber A is registered as an authorized user under his subscriber call number PN1. For this purpose, the associated call number TN1 of the subscriber terminal 11 is read from the storage area HUS of the storage unit 25 of the telecommunication terminal 10, while the subscriber A is then registered as a current user. Furthermore, there is checked whether as regards subscriber call number PN1, restrictions used for preventing the transfer of a call to the subscriber terminal 11 are stored in the storage area HUS of the subscriber terminal 10.

For example, at this point the accessibility of subscriber A can be restricted to a specific time of day with the aid of a telecommunication parameter of subscriber A.

If in step 75 no such restricting telecommunication parameter is determined, a controller 22 will produce a call diversion signal which contains the call number TN1 of the subscriber terminal 11 and subscriber A's call number PN1 as parameters. In the steps 76, 77 and 78 this call diversion signal is transmitted to the subscriber terminal 11 via the controllers 23 and 29 of the subscriber terminal 10 and the switches 1 and 2. At that point this call diversion signal is transported via the controller 29 and the controller 23 to the controller 22 of the subscriber terminal 11 where, in step 80, it is checked for any further restricting telecommunication parameters which are stored in the subscriber terminal 11. If no rejection of the call diversion signal is made in step 80, the controller 22 sends a signalling call to the subscriber A in steps 81, 82 and 9 via the controller 23 and the user interface 20. The signalling may be performed acoustically and optically.

The communication system may also be arranged in such a way that telecommunication parameters are not fixedly stored in either subscriber terminal used, like in the storage area 13 (HUS) of the subscriber terminal 10. If in that case the assignment of a subscriber call number is changed from the first subscriber terminal with which the subscriber had been registered up to that moment to a second subscriber terminal with which the subscriber is currently registered, the telecommunication parameters of the subscriber will be transmitted from the first to the second subscriber terminal by a third subscriber terminal (in this case: the subscriber terminal 10, HT) and subsequently deleted from the first subscriber terminal. The third subscriber terminal in this embodiment is used only for storing the subscriber call numbers and the associated call numbers of the subscriber terminals with which the respective subscribers are registered at the moment under consideration. A redundant storage of the telecommunication parameters is then refrained from. The storage area 13 (HUS) can be omitted. During the registration, the change of the assignment of the subscriber call number in the third subscriber terminal 10 is made known by the change of the associated subscriber terminal number.

In another embodiment, the storage area 13 (HUS) in which the telecommunication parameters of all the users are continuously stored, is distributed over various subscriber terminals. This solution is advantageous for communication systems in which, because of a very large number of subscribers, much storage capacity is required for continuously storing the telecommunication parameters of the subscribers, while the required store (HUS) cannot be rendered available by a single subscriber terminal. Furthermore, the call diversion of various terminals can be performed in parallel.

What is claimed is:

1. A communication system comprising at least three subscriber terminals which can be coupled via at least two switches, and to which subscriber terminals several call numbers can be assigned, for which telecommunication parameters are definable, wherein the telecommunication parameters are stored in a storage means of the subscriber terminals and wherein telecommunication parameters related to a subscriber call number are transmitted from a first subscriber terminal to any second subscriber terminal when an assignment of the subscriber call number is changed from the first subscriber terminal to the second subscriber terminal without loss of the telecommunication parameters in the second subscriber terminal.

2. The communication system as claimed in claim 1, wherein, for the subscriber call numbers a third subscriber terminal includes storage means for continuously storing the telecommunication parameters related to the subscriber call number and, when a change of the assignment of the subscriber call number is made, the telecommunication parameters are transmitted from the third subscriber terminal to the second subscriber terminal to store the telecommunication parameters in the storage means of the second subscriber terminal.

3. The communication system as claimed in claim 1, wherein, when an assignment of the subscriber call number is changed from the first subscriber terminal to the second subscriber terminal, the telecommunication parameters related to the subscriber call number are transmitted from the first subscriber terminal to the second subscriber terminal to store the telecommunication parameters in the storage means of the second subscriber terminal.

4. The communication system as claimed in claim 1, wherein an entry of both the subscriber call number and a personal identification number is necessary for changing an assignment of the subscriber call number to the second subscriber terminal and/or for changing the telecommunication parameters related to the subscriber call number.

5. The communication system as claimed in claim 1, wherein one subscriber terminal is provided for each subscriber call number, which subscriber terminal is used for receiving calls for a respective subscriber and for diverting the received calls from there to the subscriber terminal to which the subscriber call number of the subscriber is currently assigned.

6. The communication system as claimed in claim 1, wherein a fixed subscriber terminal call number is assigned to each subscriber terminal in addition to respective subscriber call numbers.

7. The communication system as claimed in claim 1, further comprising storage means for storing telecommunication parameters relating to a subscriber's restricted communication arranged in each subscriber terminal.

8. The communication system as claimed in claim 1, wherein the subscriber terminal comprises means for controlling and/or restricting and/or facilitating a user access by evaluating the telecommunication parameters.

9. A subscriber terminal for a communication system as claimed in claim 1, comprising storage means for storing telecommunication parameters belonging to at least one call number and control means for controlling a sending and receiving of telecommunication parameters belonging to a particular call number.

* * * * *